United States Patent
Fairfield et al.

(10) Patent No.: US 10,220,776 B1
(45) Date of Patent: *Mar. 5, 2019

(54) SCENARIO BASED AUDIBLE WARNINGS FOR AUTONOMOUS VEHICLES

(71) Applicant: Waymo LLC, Mountain View, CA (US)

(72) Inventors: Nathaniel Fairfield, Mountain View, CA (US); Benjamin W. Charrow, Millbrae, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,699

(22) Filed: Dec. 5, 2017

Related U.S. Application Data

(63) Continuation of application No. 15/054,958, filed on Feb. 26, 2016, now Pat. No. 9,868,391.

(51) Int. Cl.
G06F 19/00 (2018.01)
B60Q 5/00 (2006.01)
G05D 1/02 (2006.01)

(52) U.S. Cl.
CPC ............ B60Q 5/005 (2013.01); G05D 1/021 (2013.01)

(58) Field of Classification Search
CPC .............................. B60Q 5/005; G05D 1/021
USPC ...................................................... 701/1, 25
See application file for complete search history.

(56) References Cited

U.S. PATENT DOCUMENTS

| 7,103,460 | B1 | 9/2006 | Breed |
| 8,514,100 | B2 | 8/2013 | Yamashita |
| 8,849,494 | B1* | 9/2014 | Herbach ............... B60W 30/00 701/24 |

(Continued)

FOREIGN PATENT DOCUMENTS

| CN | 103707826 A | 4/2014 |
| DE | 102009058903 A | 7/2010 |

(Continued)

OTHER PUBLICATIONS

Pennycooke, Nicholas, "AEVITA: Designing Biomimetic Vehicle-to-Pedestrian Communication Protocols for Autonomously Operating & Parking On-Road Electric Vehicles", 184 pgs. (2010).

*Primary Examiner* — Ronnie M Mancho
(74) *Attorney, Agent, or Firm* — Lerner, David, Littenberg, Krumholz & Mentlik, LLP

(57) ABSTRACT

Aspects of the disclosure relate to providing audible indications to objects located externally to a vehicle having an autonomous driving mode. For instance, a vehicle is controlled in the autonomous driving mode along a particular path. Information identifying a characteristic and a location of an object is received. When vehicle is determined to be prevented from proceeding along the particular path because of the location of the object, a scenario is identified using the characteristic. The scenario is associated with a predetermined period of time and a type of audible indication used to identify an audible indication. After the waiting the predetermined period, when the object is determined to still be preventing the vehicle from proceeding along the particular path, the audible indication is played through a speaker of the vehicle to encourage the object to take an action to allow the vehicle to proceed along the particular path.

20 Claims, 13 Drawing Sheets

(56) References Cited

U.S. PATENT DOCUMENTS

| | | | |
|---|---|---|---|
| 8,996,224 B1* | 3/2015 | Herbach | G05D 1/0011 180/116 |
| 9,008,890 B1* | 4/2015 | Herbach | B60W 30/00 701/26 |
| 9,196,164 B1 | 11/2015 | Urmson et al. | |
| 9,868,391 B1* | 1/2018 | Fairfield | B60Q 5/005 |
| 2011/0128161 A1 | 6/2011 | Bae et al. | |
| 2011/0252248 A1* | 10/2011 | Cameron | G06Q 10/04 713/300 |
| 2012/0166042 A1 | 6/2012 | Kokido et al. | |
| 2014/0113619 A1* | 4/2014 | Tibbitts | G07C 5/008 455/419 |
| 2014/0309806 A1* | 10/2014 | Ricci | B60Q 1/00 701/1 |
| 2014/0309870 A1* | 10/2014 | Ricci | H04W 4/21 701/36 |
| 2015/0232065 A1* | 8/2015 | Ricci | B60R 25/01 701/36 |
| 2015/0329043 A1 | 11/2015 | Skvarce | |
| 2016/0001781 A1* | 1/2016 | Fung | B60W 40/08 701/36 |
| 2016/0261425 A1 | 9/2016 | Horton et al. | |
| 2016/0357262 A1 | 12/2016 | Ansari | |
| 2016/0358477 A1 | 12/2016 | Ansari | |

FOREIGN PATENT DOCUMENTS

| | | |
|---|---|---|
| JP | 2001307249 A2 | 11/2001 |
| WO | 2008156378 A1 | 12/2008 |

* cited by examiner

SCENARIO BASED AUDIBLE WARNINGS FOR AUTONOMOUS VEHICLES

CROSS-REFERENCE TO RELATED APPLICATIONS

The present application is a continuation of U.S. patent application Ser. No. 15/054,958 filed Feb. 26, 2016, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination.

Human drivers can use their vehicle's horns to signal different types of information to other persons, including drivers, pedestrians, or bicyclists. In some situations, these communications can include notifying other persons that the driver needs to take some action so that the driver can proceed, such as where the other person is stopped in the roadway, at an intersection, etc. and the driver's vehicle cannot safely proceed until the other person, and in some cases his or her vehicle or bicycle moves.

BRIEF SUMMARY

One aspect of the disclosure provides a method of providing audible indications to objects located externally to a vehicle having an autonomous driving mode. The method includes, controlling, by one or more processors, the vehicle in the autonomous driving mode along a particular path; receiving, by the one or more processors, information identifying a characteristic of an object and a location of the object external to the vehicle; an determining, by the one or more processors, that the vehicle is prevented from proceeding along the particular path because of the location of the object. When the vehicle is determined to be prevented from proceeding, a scenario from a set of predetermined scenarios is identified, by the one or more processors, using the characteristic. Each scenario of the set of predetermined scenarios being associated with a predetermined period of time and a type of audible indication. The method also includes waiting, by the one or more processors, the predetermined period of time associated with the identified scenario; after the waiting the predetermined period of time associated with the identified scenario, determining, by the one or more processors, that the object continues to prevent the vehicle from proceeding along the particular path; identifying, by the one or more processors, an audible indication according to the type of audible indication associated with the identified scenario; and when the object is determined to continue to prevent the vehicle from proceeding along the particular path, playing, by the one or more processors, the audible indication through a speaker of the vehicle to encourage the object to take an action to allow the vehicle to proceed along the particular path.

In one example, the information identifying the characteristic also indicates that the object is currently stationary. In this example, the information identifying the characteristic also indicates that the object is another vehicle. Alternatively, the information identifying the characteristic also indicates that the object is a pedestrian. In yet another alternative, the information identifying the characteristic also indicates that the object is a bicyclist. In another example, the method also includes determining that the object is currently not being blocked by another object that would prevent the object from proceeding. In another example, the location of the object corresponds to a same lane as the vehicle and within the particular path. In another example, the characteristic of the object includes the status of a turn signal of the object. In another example, the location of the object corresponds to a particular traffic signal light, and the method also includes determining that the status of the particular traffic signal indicates that the object currently has a right of way, and the scenario is identified further based on the status of the particular traffic signal. In another example, the location of the object corresponds to a particular stop sign, and the method also includes determining that the object currently has a right to proceed despite the presence of the stop sign, and the scenario is identified further based on the stop sign. In another example, the location of the object corresponds to a particular yield sign, and the method further includes determining that the object currently has a right to proceed despite the presence of the yield sign, and the scenario is identified further based on the yield sign.

Another aspect of the disclosure provides a system for providing audible indications to objects located externally to a vehicle having an autonomous driving mode. The system includes one or more processors configured to control the vehicle in the autonomous driving mode along a particular path; receive information identifying a characteristic of an object and a location of the object external to the vehicle; and determine that the vehicle is prevented from proceeding along the particular path because of the location of the object. When the vehicle is determined to be prevented from proceeding, the one or more processors are also configured to identify a scenario from a set of predetermined scenarios using the characteristic. Each scenario of the set of predetermined scenarios being associated with a predetermined period of time and a type of audible indication. The one or more processors are also configured to wait the predetermined period of time associated with the identified scenario; after the waiting the predetermined period of time associated with the identified scenario, determine that the object continues to prevent the vehicle from proceeding along the particular path; identify an audible indication according to the type of audible indication associated with the identified scenario; and when the object is determined to continue to prevent the vehicle from proceeding along the particular path, play the audible indication through a speaker of the vehicle to encourage the object to take an action to allow the vehicle to proceed along the particular path.

In one example, the one or more processors are further configured to determine that the object is currently not being blocked by another object that would prevent the object from proceeding. In another example, the location of the object corresponds to a same lane as the vehicle and within the particular path. In another example, the characteristic of the object includes the status of a turn signal of the object. In another example, the location of the object corresponds to a particular traffic signal light, and the one or more processors are also configured to determine that the status of the particular traffic signal indicates that the object currently has a right of way, and identify the scenario further based on the status of the particular traffic signal. In another example, the location of the object corresponds to a particular stop sign, and the one or more processors are also configured to determine that the object currently has a right to proceed despite the presence of the stop sign, and identify the scenario further based on the stop sign. In another example, the location of the object corresponds to a particular yield sign, and the one or more processors are also configured to determine that the object currently has a right to proceed despite the presence of the yield sign, and identify the scenario further based on the yield sign. In another example, the system also includes the vehicle and the speaker.

A further aspect of the disclosure provides a non-transitory computer readable storage medium on which instructions are stored. The instructions, when executed by one or more processors cause the one or more processors to perform a method of providing audible indications to objects located externally to a vehicle having an autonomous driving mode. The method includes controlling the vehicle in the autonomous driving mode along a particular path; receiving information identifying a characteristic of an object and a location of the object external to the vehicle; and determining that the vehicle is prevented from proceeding along the particular path because of the location of the object. When the vehicle is determined to be prevented from proceeding, the method also includes identifying a scenario from a set of predetermined scenarios using the characteristic. Each scenario of the set of predetermined scenarios being associated with a predetermined period of time and a type of audible indication. The method also includes waiting the predetermined period of time associated with the identified scenario; after the waiting the predetermined period of time associated with the identified scenario, determining that the object continues to prevent the vehicle from proceeding along the particular path; identifying an audible indication according to the type of audible indication associated with the identified scenario; and when the object is determined to continue to prevent the vehicle from proceeding along the particular path, playing the audible indication through a speaker of the vehicle to encourage the object to take an action to allow the vehicle to proceed along the particular path.

DETAILED DESCRIPTION

Figure 1:
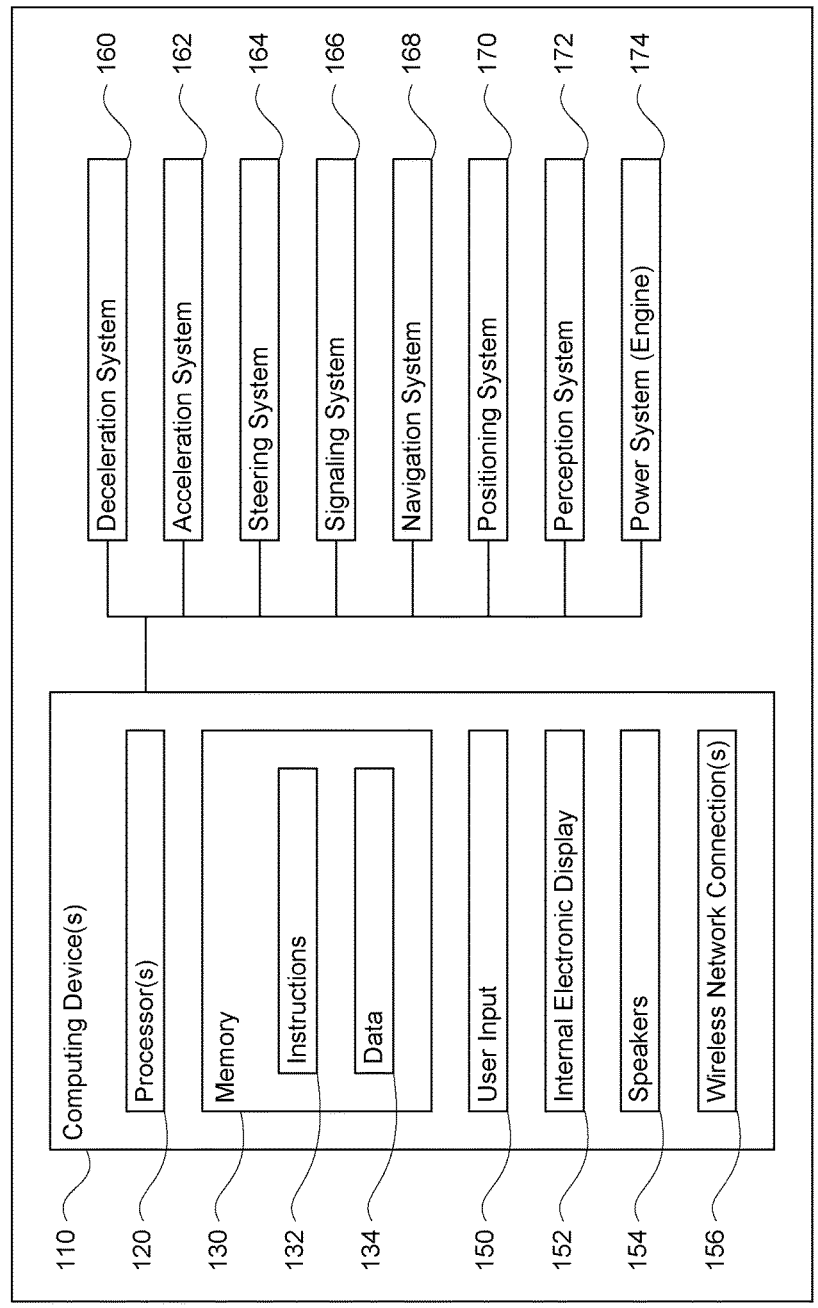
FIG. 1 is a functional diagram of an example vehicle in accordance with aspects of the disclosure.

The technology relates to audible communications between an autonomous vehicle and other objects such as drivers, pedestrians, bicyclists, etc. As noted above, human drivers can use their vehicle's horns to signal different types of information to other persons, including drivers, pedestrians, or bicyclists. In some situations, these communications can include notifying other persons that the driver needs to take some action so that the driver can proceed, such as where the other person is stopped in the roadway, at an intersection, etc. and the driver's vehicle cannot safely proceed until the other person, and in some cases his or her vehicle or bicycle moves. In the case of an autonomous vehicle, different types of horn or honking noises can be used to signal similar information.

There are many situations in which an autonomous vehicle may be prevented from proceeding along a particular path because of another object that is currently not moving. When this is the case, using information from a perception system, the vehicle may determine whether the object is being blocked by another object. If so, the vehicle may simply wait for the object to move before proceeding. If not, the autonomous vehicle may determine that it is or that it is about to become "stuck" because of the inaction of the object. After waiting a predetermined period of time, if the object has not moved, the autonomous vehicle may take some action.

In many examples, the autonomous vehicle may be able to simply maneuver around the object. However, in the case where there is not enough room to do so, an intersection, a narrow roadway, or oncoming traffic, the vehicle may use audible signals. For instance, when this object is another vehicle, bicyclist, or pedestrian, the vehicle can use play a honking noise through a speaker to signal to the object that the autonomous vehicle is present and that the object needs to proceed in order to allow the autonomous vehicle to proceed itself.

As noted above, identifying that the vehicle is or is about to be stuck may be based upon information received from the vehicle's perception system. For example, the autonomous vehicle may detect an object that is stopped and currently blocking the path of the vehicle. The object may be stopped in front of the vehicle in the vehicle's lane where there is no other object in front of the object. Similarly, the object may be attempting to make a turn or proceed through an intersection at a stop sign or yield sign, but there is no oncoming or other traffic preventing the object from proceeding. In another example, the object may be stopped at a particular traffic signal light, but that traffic signal light is green, and thus indicates that the object currently has the right to proceed. In another example, the autonomous vehicle may be stopped at multiway stop, but may recognize that the other object was stopped first, and thus has the right to proceed but is not proceeding.

The information may be used to identify a particular scenario of a set of predefined scenarios. These scenarios may be generated based on actual experience (i.e. an autonomous vehicle has been in a similar situation in the past) or based on expected experiences. A given scenario may identify a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc.

Each of these scenarios may be associated with predetermined period of time and a particular type of honking noise. For instance, a table or database may link specific scenarios with predetermined periods of time and specific types of honking noises. In that regard, upon identification of a particular scenario, a type of honking noise appropriate for the scenario may be identified.

By making the selection of the predetermined amount of time and type of an audible indication scenario based, the efficacy of making a honking noise may be increased and the number of false positives (or honking noises that are inappropriately made at the wrong place or wrong time) may be avoided. In addition, the autonomous vehicle may save having to wait indefinitely for the object to move out of the way. In some cases, the can reduce the likelihood of and possibly avoid the need to make more dangerous maneuvers with the vehicle in order to avoid other objects.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

While the scenarios may be defined as requirements, when considered together, the requirements describe situations in which the vehicle 100 is prevented from proceeding safely along a path because of another object, but there is no reason why that other object should not move from its current position or trajectory in order to allow the vehicle 100 to continue along the path. Example predetermined scenarios include, for example, situations where the object may be stopped in front of the vehicle in the vehicle's lane where there is no other object in front of the object; where the object may be attempting to make a turn or proceed through an intersection at a stop sign or yield sign, but there is no oncoming or other traffic preventing the object from proceeding; where the object may be stopped at a particular traffic signal light, but that traffic signal light is green, and thus indicates that the object currently has the right to proceed; where vehicle 100 may be stopped at multiway stop, but may recognize that the other object was stopped first, and thus has the right to proceed but is not proceeding. These scenarios may be generated based on actual experience (i.e. an autonomous vehicle has been in a similar situation in the past) or based on expected experiences constructed by human operators.

At least some of the predefined scenarios may be associated with a predetermined period of time and a particular type of audible indication. In that regard, upon identification of a particular scenario, a predetermined period of time and a type of honking noise appropriate for the scenario may be identified. As an example, a particular type of audible indication may define a pitch, pattern (e.g., several short sharp honks versus one sustained honk), duration, and volume for a honking noise. In this regard, different predetermined scenarios may be associated with different predetermined periods of time and/or types of audible indications.

As noted above, different predetermined scenarios can be associated with different predetermined periods of time. For instance, in some scenarios, other vehicles or objects may be giving some indication that they are moving towards vehicle 100 in a dangerous way. In these situations, depending on how another vehicle is moving towards the vehicle 100, and the context of the specific situation, the predetermined period of time may vary. As an example, if the vehicle 100 is driving on a highway at high speeds, such as 55 miles per hour or more or less, and another vehicle is drifting into the vehicle 100's lane, the vehicle 100 may want to wait a first predetermined period of time before honking since it may be more likely the other vehicle (and/or the other vehicle's driver) is unaware of vehicle 100's presence. However, if vehicle 100 is on a narrow road traveling at slower speeds, such as 25 miles per hour or more or less, and another vehicle starts moving toward vehicle 100, the vehicle 100 can wait a second predetermined period of time, longer than the first predetermined period of time before making the audible indication since there is more time for the other vehicle (or other vehicle's driver) to react.

In another example, objects such as other vehicles, pedestrians, or bicyclists may not necessarily be in the vehicle's way or giving any indication of moving, but are in a situation (on a crosswalk, half-way out of a driveway, etc.), where the vehicle's computing devices 110 may determine that the other object does or may not see vehicle 100 but the other object is likely to be preparing to move towards vehicle 100. In these examples, the vehicle 100 may provide an audible indication to the object indicating the presence of vehicle 100 nearby the object. For instance, if vehicle 100 is stopped at multi way stop with another vehicle which is also stopped at the multiway stop (but for a different stop sign than vehicle 100) and the other vehicle is not moving, the predetermined period of time may depend upon on how long vehicle 100 has been observing the other vehicle. For example, if prior to coming to a stop, the vehicle 100 could see the other vehicle not moving for 30 seconds, vehicle 100's computing devices 100 may wait a first predetermined period of time before making an audible indication. However, if vehicle 100 could not see the other vehicle until the vehicle 100 was blocked by other vehicle (e.g., the self-driving car turned onto the road the other car was on shortly before the stop), then the vehicle 100's computing devices 110 may wait a second predetermined period of time, longer than the first predetermined period of time before making the audible indication. The type of audible indication may depend upon the type of object (e.g., bicyclist, pedestrian, other vehicle) in the situation. If an object located in front of vehicle 100 and the object is trying to turn right is a cyclist, the audible indication may define a shorter and quieter noise than if the object is a vehicle. This is because cyclists may have an easier time hearing a honking noise. In this regard, there is a delicate balance between playing a honking noise that gets the object's attention but is not so "jolting" to the object (or driver, or bicyclist, or pedestrian), that the honking noise is alarming or otherwise makes the object (or driver, or bicyclist, or pedestrian) uncomfortable.

However, even for the same object type, the volume of an audible indication could be varied depending on other aspects of the situation. For instance, vehicle 100 may require a quieter honking noise to notify another vehicle in front of vehicle 100, than would be needed to signal another vehicle across a large multiway stop.

In other examples, the volume and duration of an audible indication may be changed based upon the urgency of the scenario. For instance, an emergency vehicle may be trying to pass vehicle 100 on a narrow road. If vehicle 100 is unable to get out of the emergency vehicle's way because vehicle 100 cannot pull over and there are objects (vehicles, pedestrians, or bicyclists) in front of vehicle 100, the audible indication may be generally louder than the aforementioned examples, given both the possibility of a siren and the urgency of the situation, as well as generally longer in duration to ensure that the vehicle 100 captures the object's attention.

Although association between a predefined scenario, a predetermined period of time, and a particular type of audible indication is not limited by any particular data structure, the data may be stored in computing device registers, in a relational database as a table having a plurality of different fields and records, XML documents or flat files. The data may also be formatted in any computing device-readable format.

In some examples, slight differences between otherwise very similar situations may make an audible indication if appropriate. In such situations, the scenarios may not be included in the set of predefined scenarios or may be included but not associated with a predetermined period of time and/or audible indication. As an example, in a first scenario vehicle 100 may be driving down a narrow residential road. If the vehicle 100's computing devices detect another vehicle in a driveway that is occupied (for instance by at least a driver and/or a passenger) but not moving, the vehicle 100's computing devices 110 can use this as a signal that the other vehicle may want to back out of the driveway. If the vehicle 100 and other vehicle can see each other for some amount of time (e.g., more than 15 seconds) prior to the vehicle 100 passing by the driveway (or really passing behind the other vehicle), it may be preferable for the vehicle 100 not to make an audible indication since it is reasonable to infer that the other vehicle (and/or driver of the other vehicle) can see the vehicle 100 and is letting it pass. However, in a second scenario, if the two vehicles cannot see each other until just before the vehicle 100 passes the other vehicle (for instance for less than 5 seconds prior to when the vehicle 100 would pass the other vehicle), there is a higher likelihood that the other vehicle has not seen the self-driving car, so it would be a good idea to make an audible indication. In this regard, only the second scenario would be included in the set of predetermined scenarios, or the first scenario may not be associated with a predetermined period of time and/or type of audible indication.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 134 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a destination location completely autonomously using data from the detailed map information and navigation system 168. Computer 110 may use the positioning system 170 to determine the vehicle's location and perception system 172 to detect and respond to objects when needed to reach the location safely. In order to do so, computer 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computer 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line.

Figure 2:
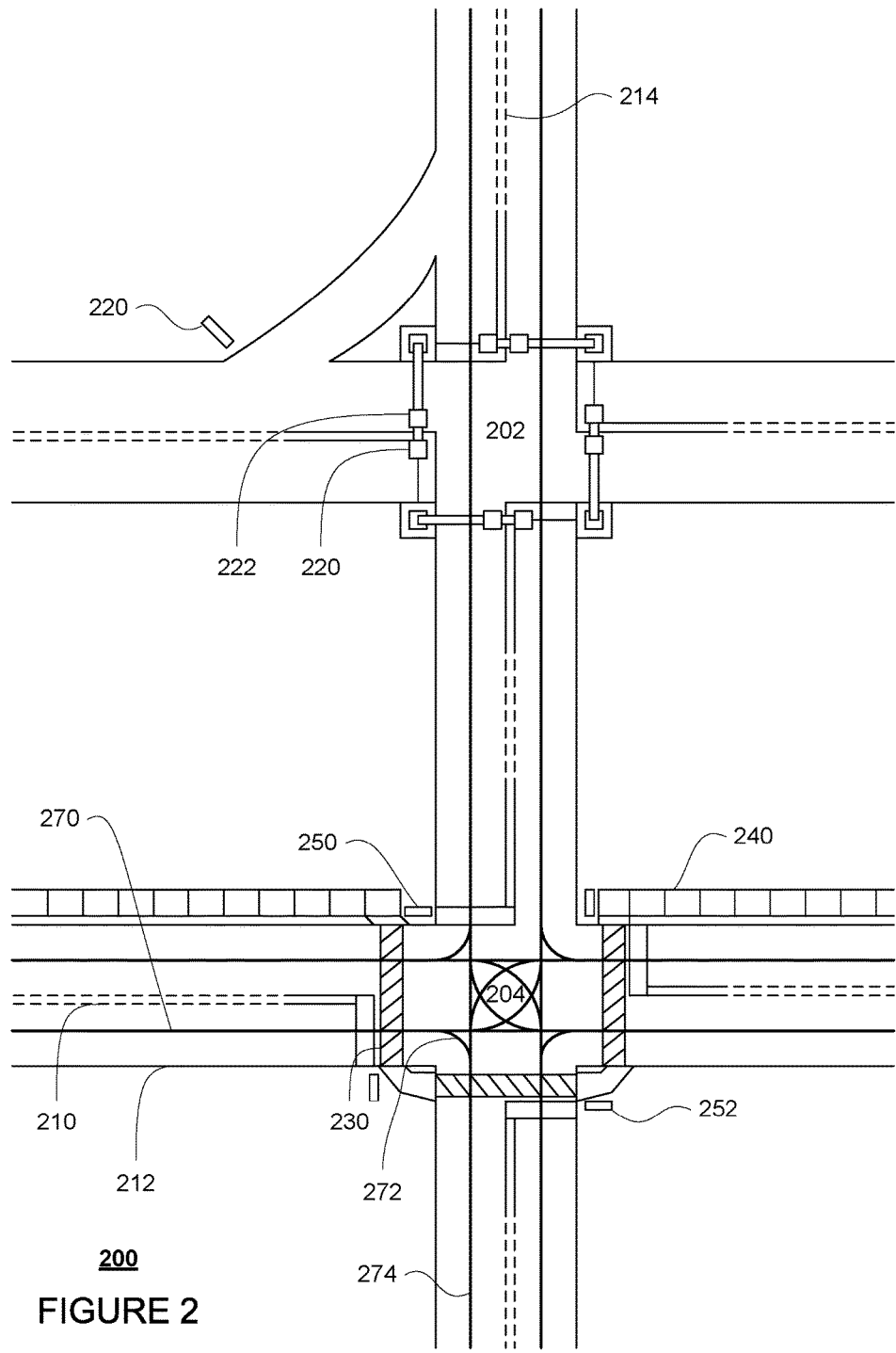
FIG. 2 is an example representation of detailed map information in accordance with aspects of the disclosure.
Figure 3A:
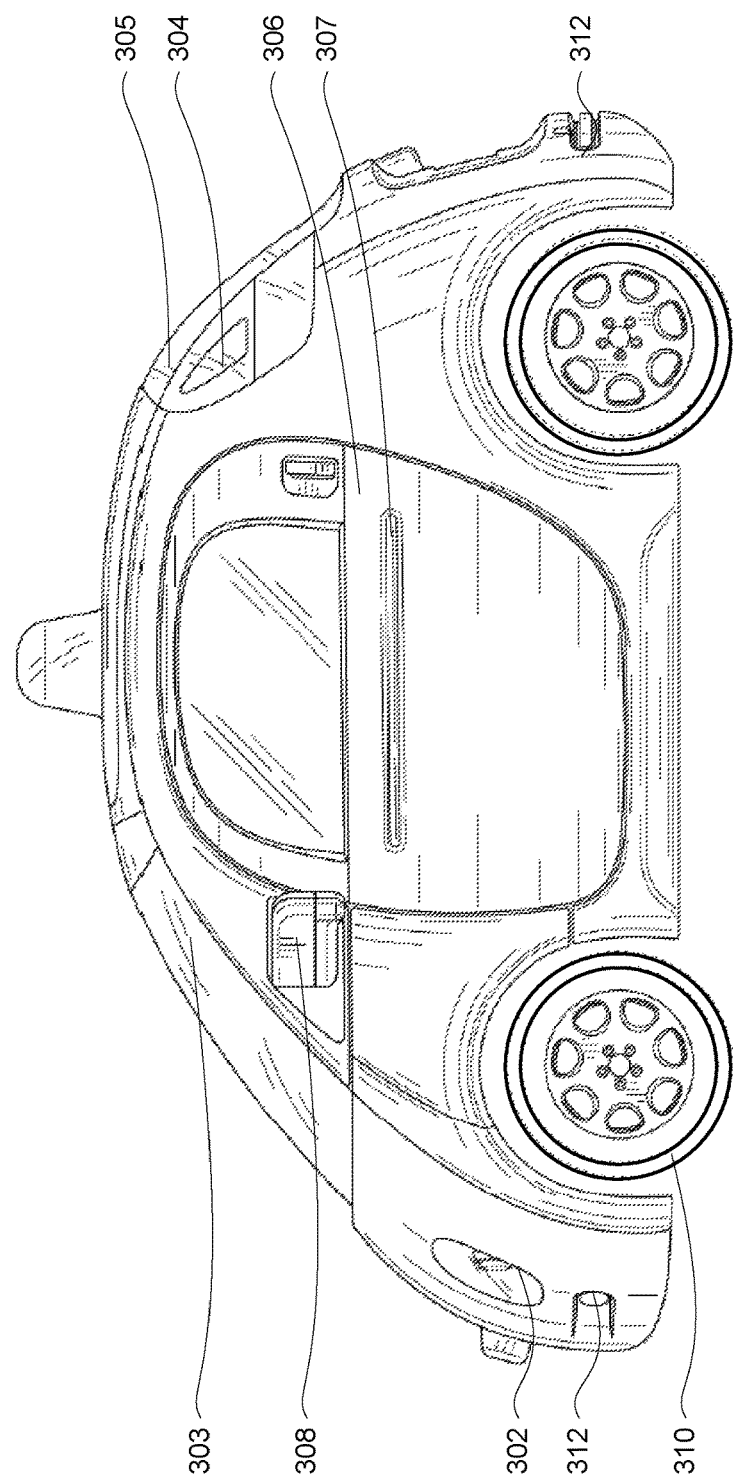
FIGS. 3A-3D are example external views of a vehicle in accordance with aspects of the disclosure.
Figure 3C:
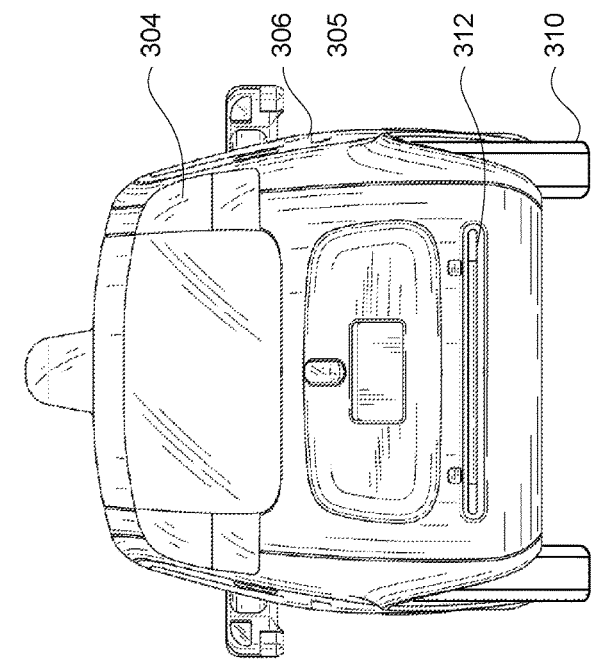
Figure 3B:
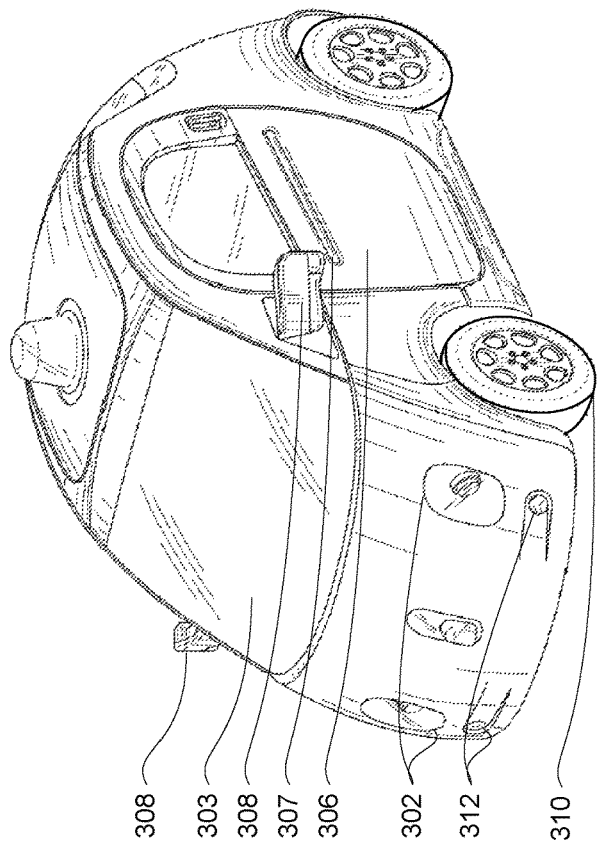
Figure 3D:
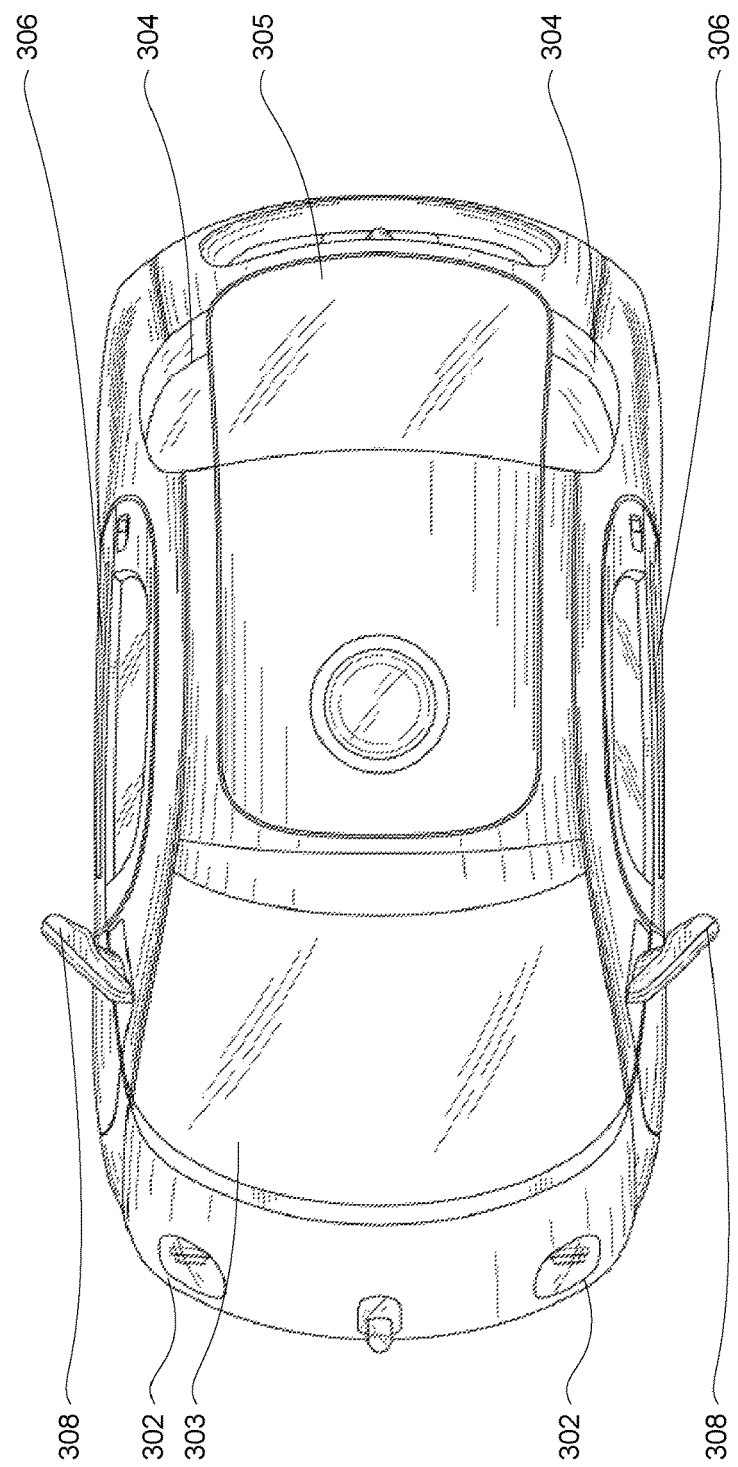

FIG. 2 is an example of map information 200 for a section of roadway including intersections 202 and 204. In this example, the detailed map information 200 includes information identifying the shape, location, and other characteristics of lane lines 210, 212, 214, traffic signal lights 220, 222, crosswalks 230, 232, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. As noted above, vehicle 100 may include various speakers 314 arranged on the external surfaces of the vehicle corresponding to the one or more speakers 154 as noted above.

Figure 4:
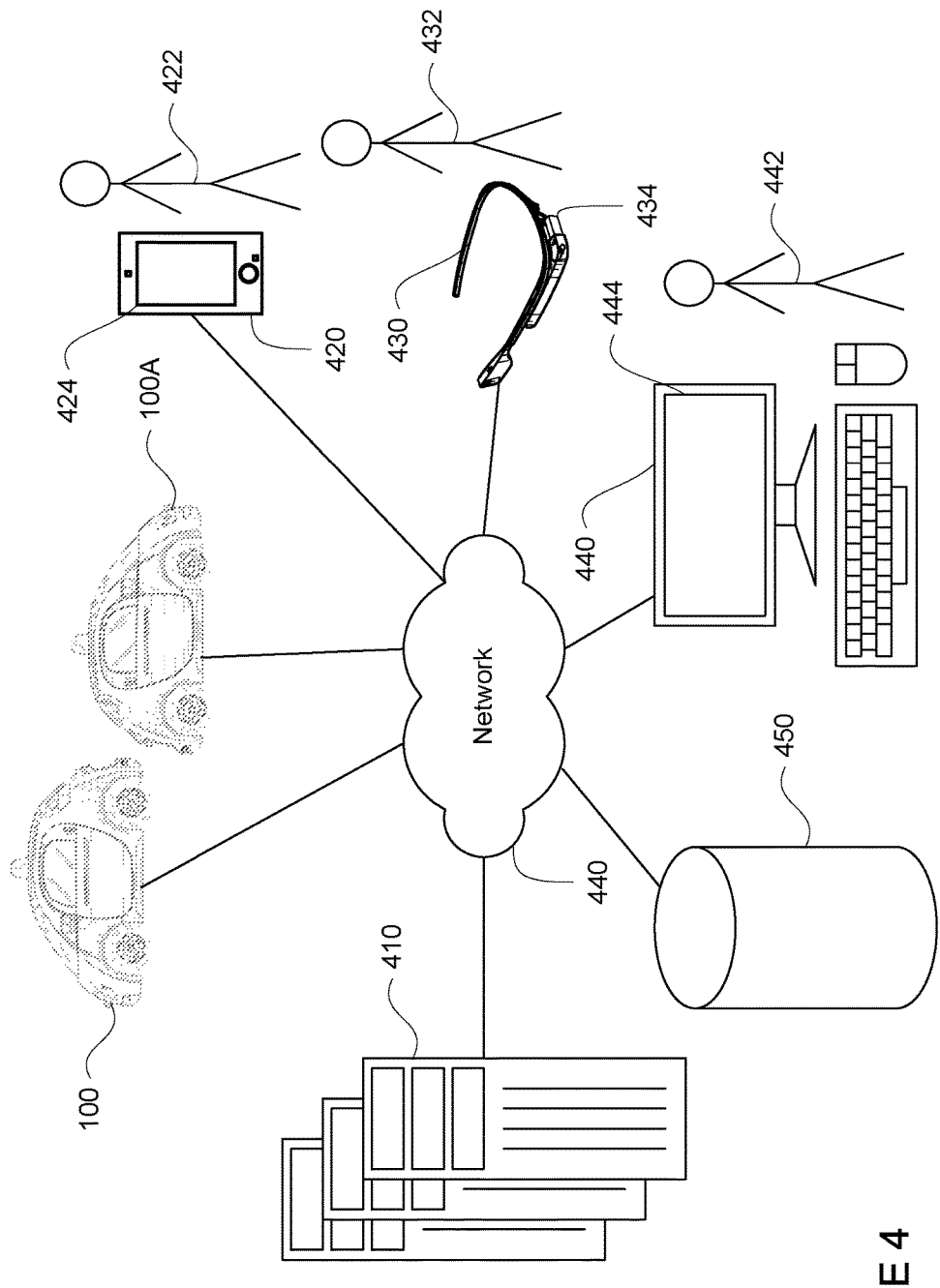
FIG. 4 is a functional diagram of an example system in accordance with an exemplary embodiment.
Figure 5:
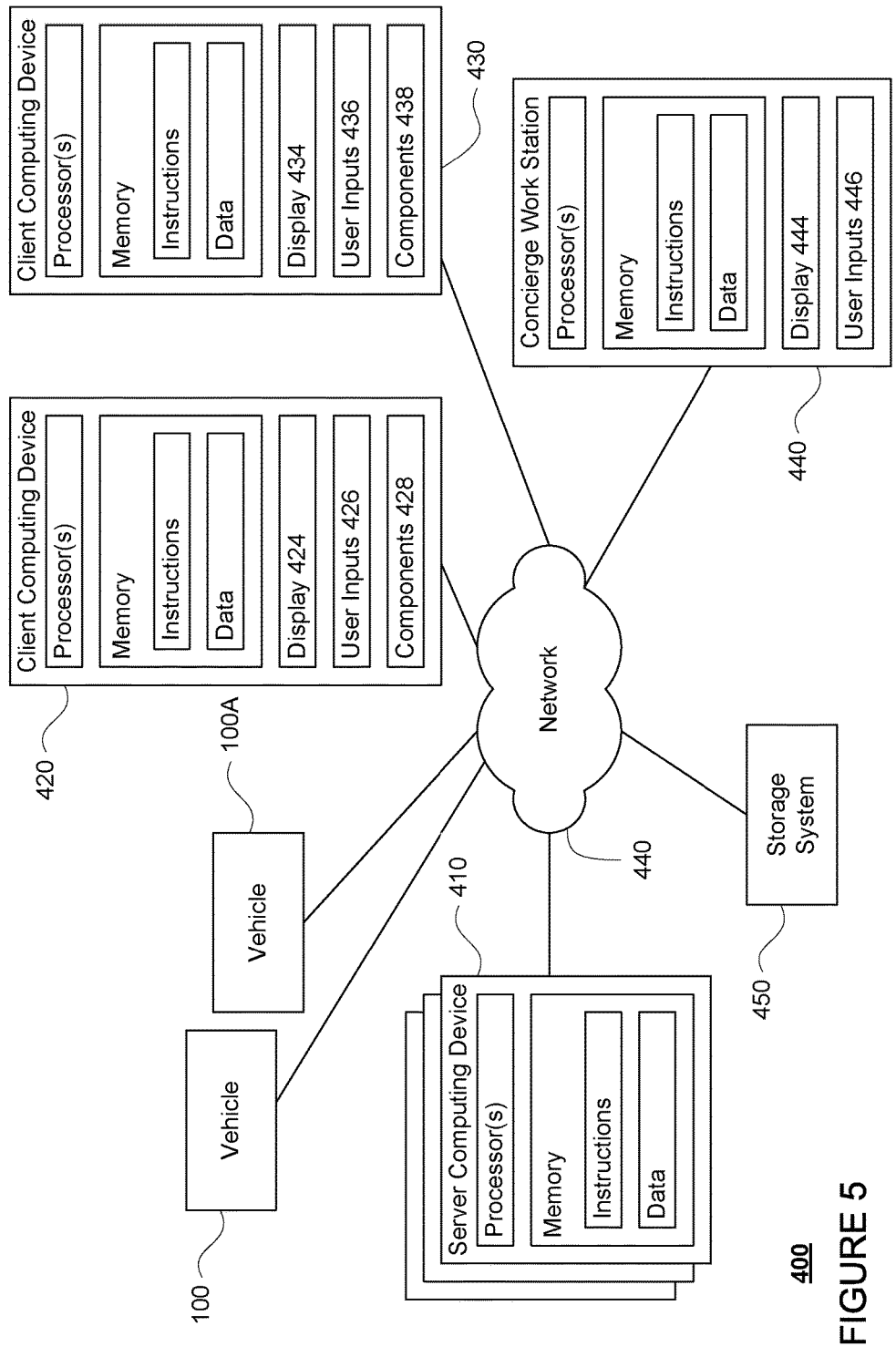
FIG. 5 is a pictorial diagram of the system of FIG. 6 in accordance with aspects of the disclosure.

The one or more computing devices 110 of vehicle 100 may also receive or transfer information to and from other computing devices. FIGS. 4 and 5 are pictorial and functional diagrams, respectively, of an example system 400 that includes a plurality of computing devices 410, 420, 430, 440 and a storage system 450 connected via a network 440. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 440, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with one or more computing devices 110 of vehicle 100 or a similar computing device of vehicle 100A as well as client computing devices 420, 430, 440 via the network 440. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 440 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touch-screen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a head-mounted computing system in FIG. 5. As an example the user may input information using a small keyboard, a keypad, microphone, using visual signals with a camera, or a touch screen.

In some examples, client computing device 440 may be concierge work station used by an administrator to provide concierge services to users such as users 422 and 432. For example, a concierge 442 may use the concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a user name and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as one or more unique signals for the user.

The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

As with memory 130, storage system 250 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 440 as shown in FIG. 4 and/or may be directly connected to or incorporated into any of the computing devices 110, 410, 420, 430, 440, etc.

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. The request may include information identifying a pickup location or area and/or a destination location or area. In response the one or more server computing devices 410 may identify and dispatch, for example based on availability and location, a vehicle to the pickup location. This dispatching may involve sending information to the vehicle identifying the user (and/or the user's client device) in order to assign the vehicle to the user (and/or the user's client computing device), the pickup location, and the destination location or area.

Once the vehicle 100 receives the information dispatching the vehicle, the vehicle's one or more computing devices 110 may maneuver the vehicle to the pickup location using the various features described above. Once the user, now passenger, is safely in the vehicle, the computer 110 may initiate the necessary systems to control the vehicle autonomously along a route to the destination location. For instance, the navigation system 168 may use the map information of data 134 to determine a route or path to the destination location that follows a set of connected rails of map information 200. The computing devices 110 may then maneuver the vehicle as described above along the path towards the destination.

As the vehicle moves along the path towards the destination, the perception system 172 may provide the computing devices 110 with information about the vehicle's environment. This may include, for instance information identifying objects in the vehicle's environment and characteristics of those objects, such as type, location, speed, heading, size, shape, etc. In some examples, the objects detected in the vehicle's environment, such as other vehicles, pedestrians, or bicyclists, may prevent the vehicle 100 from proceeding along the particular path. For instance, the perception system may detect an object that is stopped and currently blocking the path of the vehicle. In addition, to the characteristics of those objects the perception system 172 may provide situational information indicating information regarding other objects in the vehicle's environment as discussed below. As noted above, this information may be fed to the computing devices 110 which determine that the object is currently obstructing the path or is so close to the path that the vehicle cannot safely pass around the object.

FIGS. 6-10 are examples of different situations in which vehicle 100 is prevented from proceeding along a particular path because of an object. The examples are not intended to be limiting, but provide real-world situations in which an autonomous vehicle may find itself prevented from continuing along a particular path. In that regard, the examples are somewhat simplified and do not depict all situations in which the features described herein may be utilized. Each of the examples depicts a section of roadway 600 including intersections 602 and 604. In this example, intersections 602, 604, and 606 corresponds to intersections 202 and 204 of the map information 200, respectively. In this example, lane lines 610, 612, and 614 correspond to the shape, location, and other characteristics of lane lines 210, 212, and 214, respectively. Similarly, crosswalks 630 and 632 correspond to the shape, location, and other characteristics of crosswalks 230 and 232, respectively; sidewalks 640 correspond to sidewalks 240; traffic signal lights 622, 624, and 626 correspond to traffic signal lights 222, 224 and 226, respectively; stop signs 650, 652 correspond to stop signs 250, 252, respectively; and yield sign 660 corresponds to yield sign 260.

Figure 6:
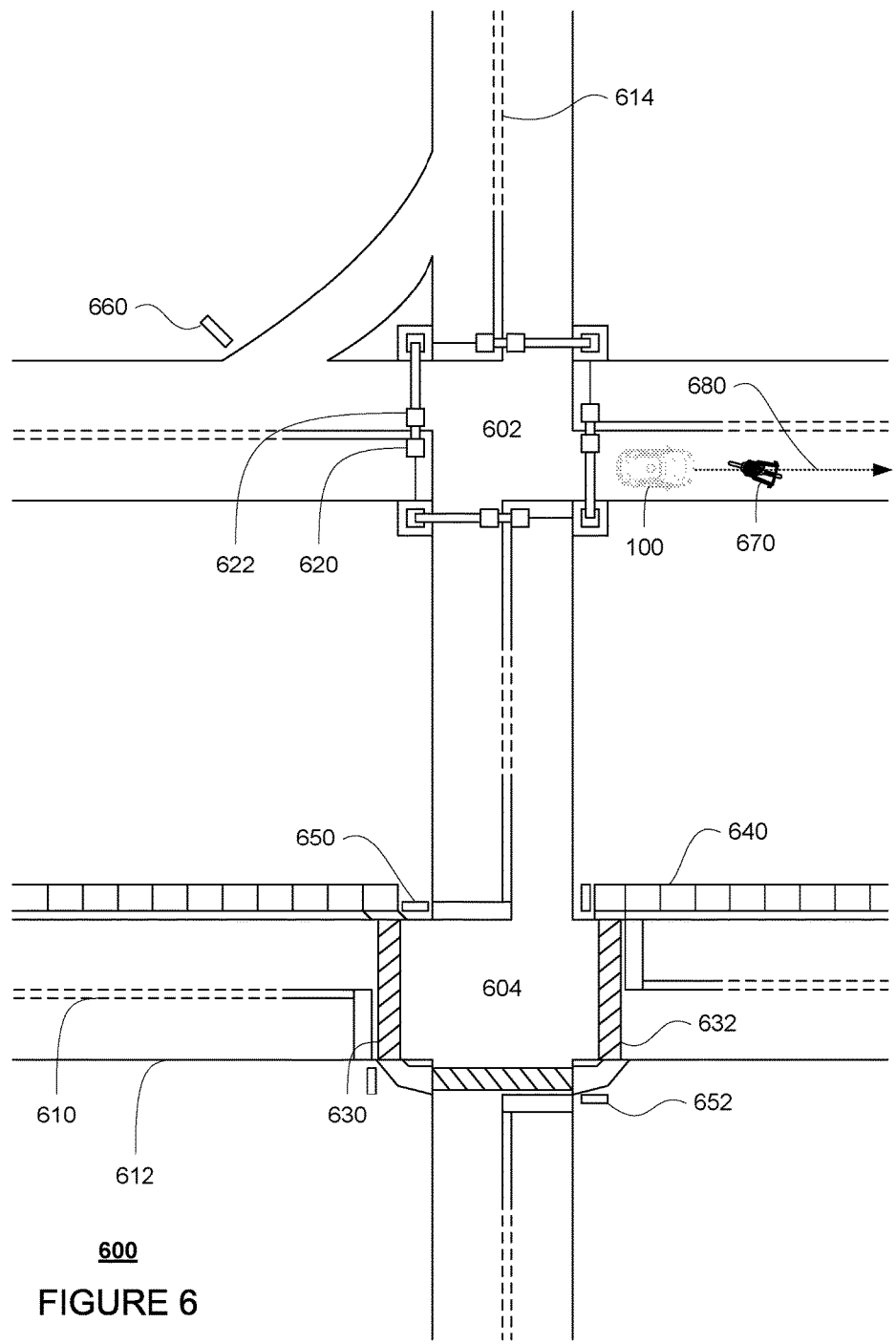
FIGS. 6-10 are examples of different situations in which vehicle 100 is prevented from proceeding along a particular path because of an object in accordance with aspects of the disclosure.

In the example of FIG. 6, vehicle 100 is driving away from intersection 602 and is located behind a bicyclist 670 is presently stopped (or moving so slowly that it is essentially stopped). There is no traffic or other obstacle in front of the bicyclist preventing the bicyclist from continuing away from intersection 602. In this example, the characteristics of the bicyclist received from the perception system 172 may identify the bicyclist as being a bicyclist type of object, located relative to vehicle 100 as shown in the example of FIG. 6, traveling at a very slow speed or stopped, and headed in a particular direction relative to the vehicle. The perception system 172 may also provide situational information indicating that the area in front of the bicyclist is clear. In this example, the bicyclist is preventing the vehicle 100 from continuing along a particular path (depicted by dashed arrow 680) towards the destination because vehicle 100 cannot safely pass or move around bicycle 670.

Figure 7:
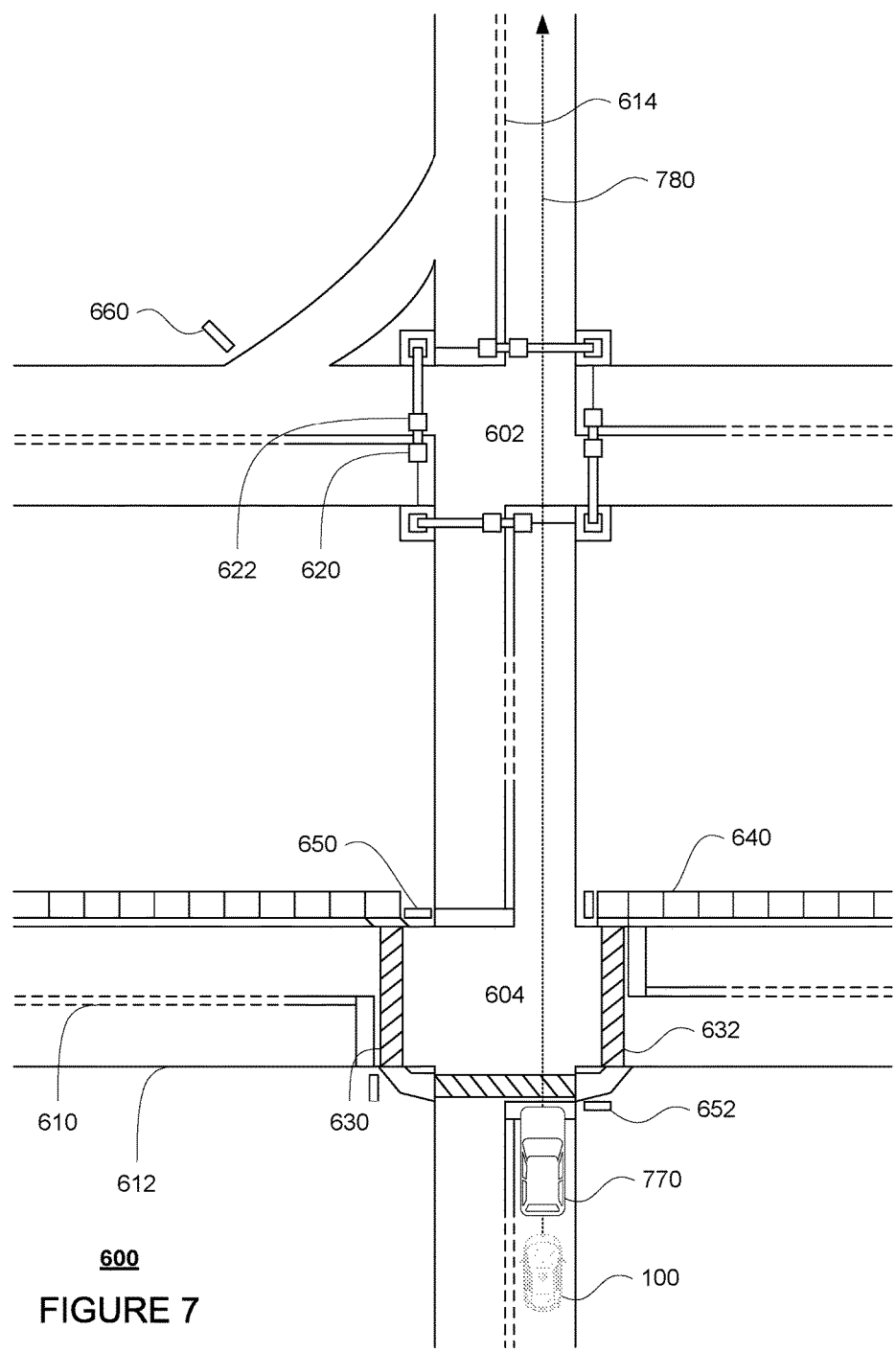

In the example of FIG. 7, vehicle 100 is driving towards intersection 604 and is located behind another vehicle 770 which is presently stopped at intersection 604 according to stop sign 652. There is no other traffic or other obstacle in front of the vehicle 770 or other vehicle approaching, passing though, or stopped at the intersection 604 which would prevent vehicle 770 from proceeding though intersection 602. In this example, the characteristics of the vehicle 770 received from the perception system 172 may identify the vehicle 770 as being a vehicle type of object, located relative to vehicle 100 and a stop sign as shown in the example of FIG. 7, stopped, and oriented in a particular direction relative to the vehicle. The perception system 172 may also provide situational information indicating that the area in front of the vehicle 770 is clear and that there are no other vehicles approaching, passing though, or stopped at the intersection 604 which would prevent vehicle 770 from proceeding though intersection 602. In this example, the vehicle 770 is preventing the vehicle 100 from continuing along a particular path (depicted by dashed arrow 780) towards the destination because vehicle 100 cannot safely pass or move around vehicle 770.

Figure 8:
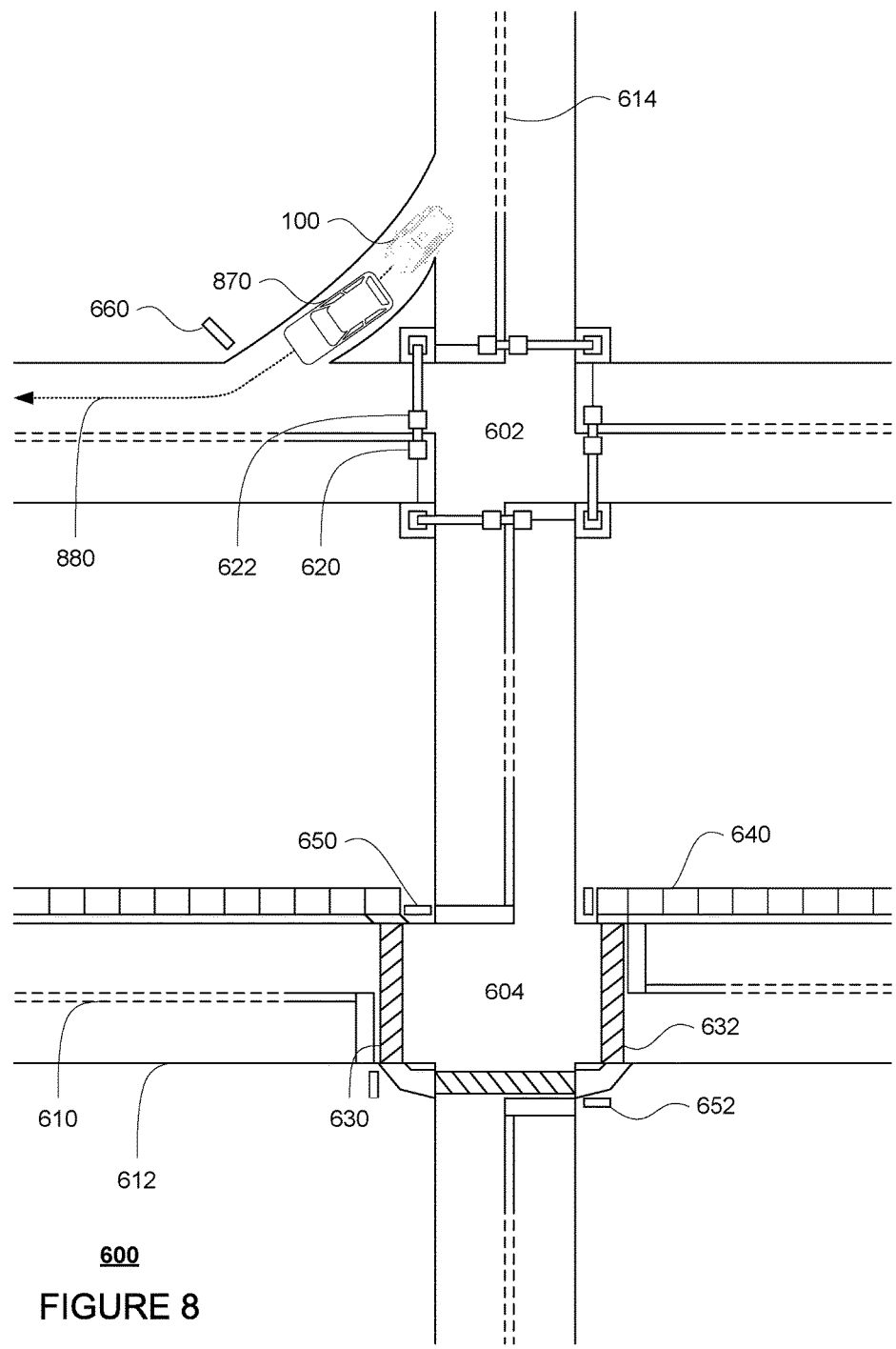

In the example of FIG. 8, vehicle 100 is driving towards intersection 604 and is located behind another vehicle 870 which is presently stopped adjacent to yield sign 660. There is no other traffic or other obstacle in front of the vehicle 870 or other vehicle approaching vehicle 870 from intersection 602. In this example, the characteristics of the vehicle 870 received from the perception system 172 may identify the vehicle 870 as being a vehicle type of object, located relative to vehicle 100 and a yield sign as shown in the example of FIG. 8, stopped, and oriented in a particular direction relative to the vehicle. The perception system 172 may also provide situational information indicating that the area in front of the vehicle 870 is clear and that there are no other vehicle approaching vehicle 870 from intersection 602. In this example, the vehicle 870 is preventing the vehicle 100 from continuing along a particular path (depicted by dashed arrow 880) towards the destination because vehicle 100 cannot safely pass or move around vehicle 870.

Figure 9:
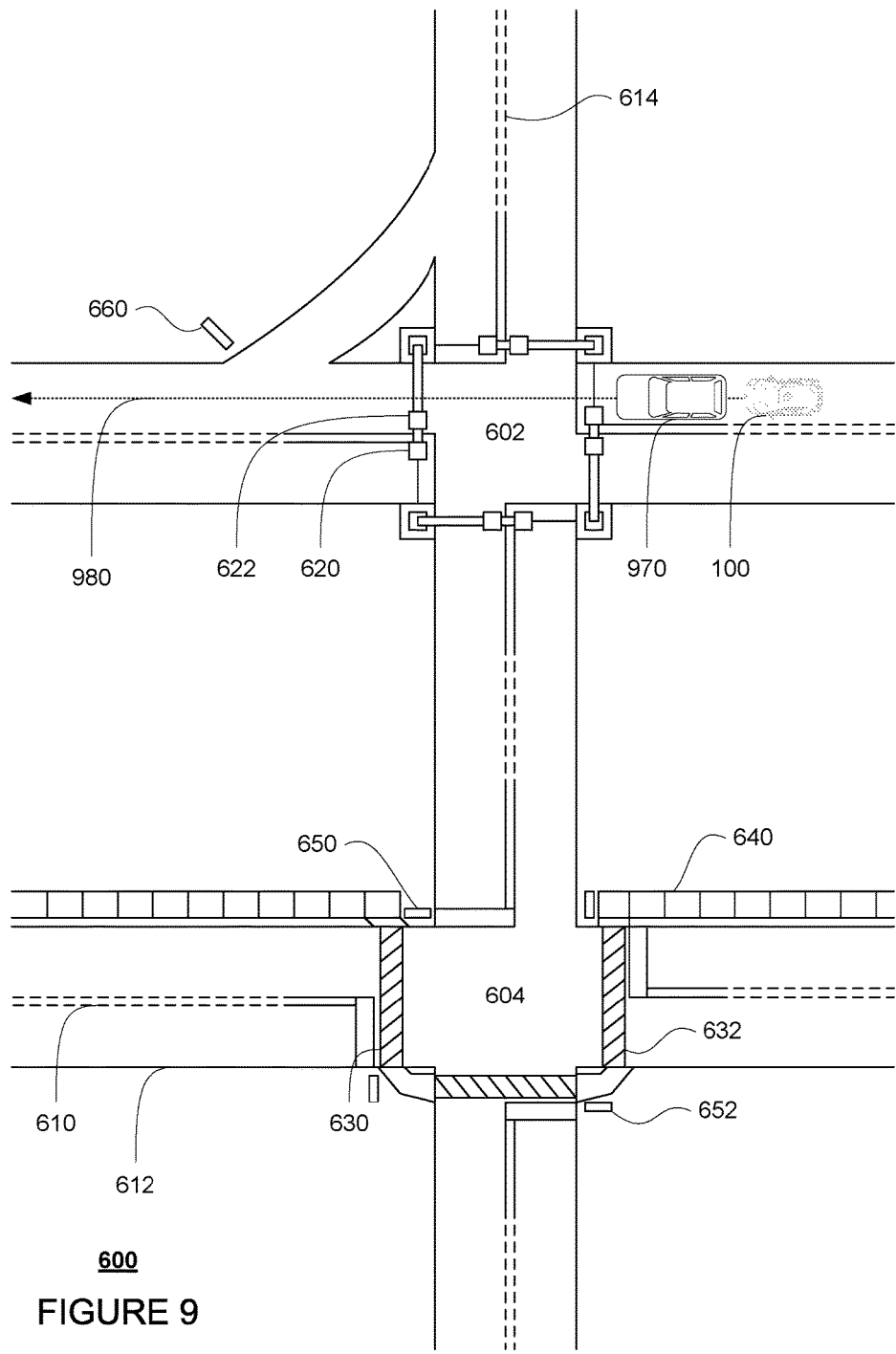

In the example of FIG. 9, vehicle 100 is driving towards intersection 204 and is located behind another vehicle 970 which is presently stopped immediately before intersection 602. There is no other traffic or other obstacle in front of the vehicle 970 or any other vehicle approaching intersection 602 which would prevent vehicle 970 from proceeding though intersection 602. Presently, traffic light signal 622, which provides direction to vehicles located in vehicle 970's current location relative to intersection 602, is a green light. This indicates that vehicle 970 has the right of way to enter the intersection 604. In this example, the characteristics of the vehicle 970 received from the perception system 172 may identify the vehicle 970 as being a vehicle type of object, located relative to vehicle 100, an intersection, and a traffic signal which would provide direction to the vehicle 970 as shown in the example of FIG. 9, stopped, and oriented in a particular direction relative to the vehicle. The perception system 172 may also provide situational information indicating that the area in front of the vehicle 970 is clear, that the traffic light is green, and that there are no other vehicles approaching intersection 602 which would prevent vehicle 970 from proceeding though intersection 602. In this example, the vehicle 970 is preventing the vehicle 100 from continuing along a particular path (depicted by dashed arrow 980) towards the destination because vehicle 100 cannot safely pass or move around vehicle 970.

Figure 10:
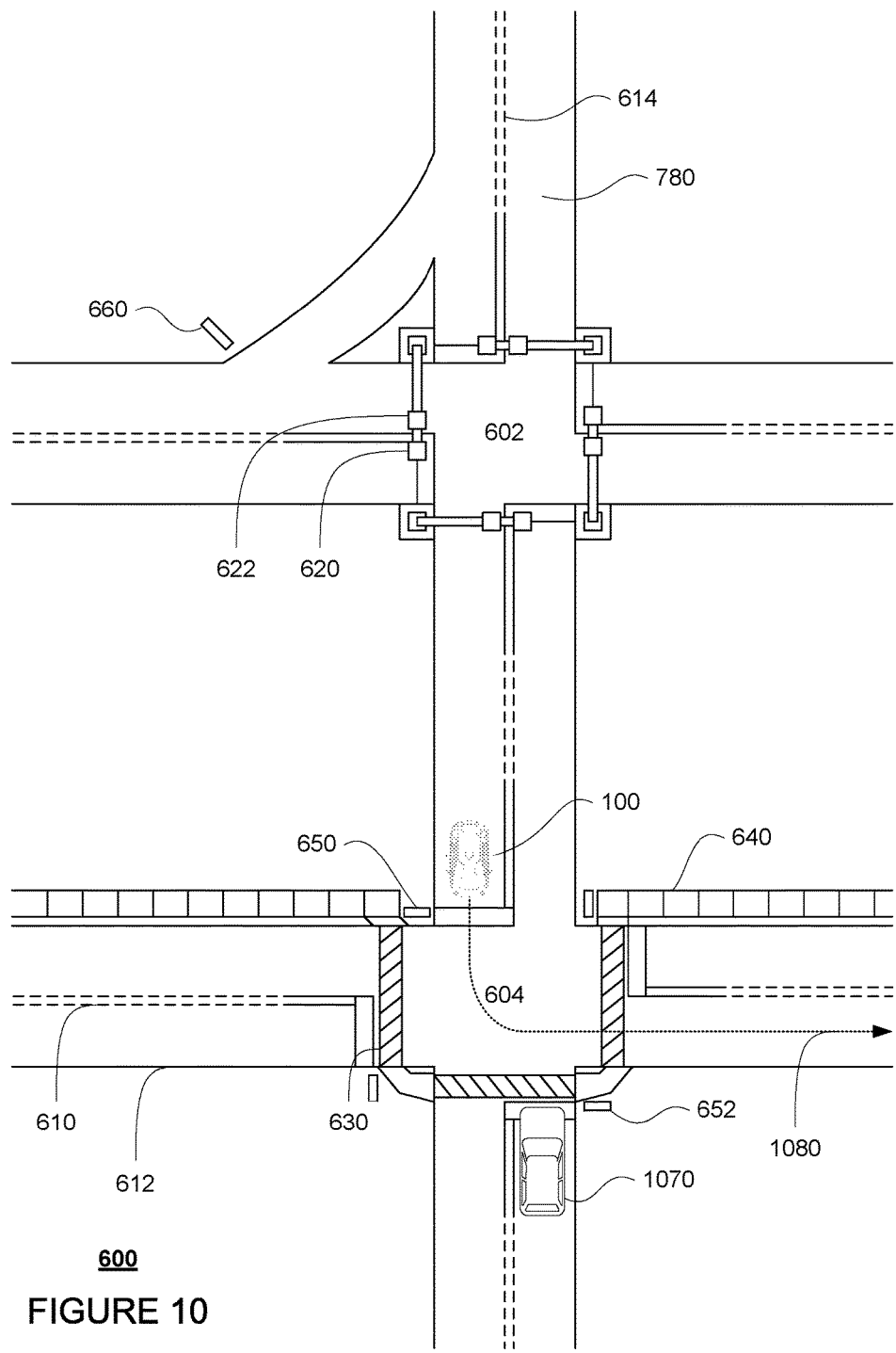

In the example of FIG. 10, vehicle 100 is stopped intersection 604 according to stop sign 650. Another vehicle 1070 is presently stopped at intersection 604 according to stop sign 652. There is no other traffic or other obstacle in front of the vehicle 1070 or other vehicle approaching, passing though, or stopped at the intersection 604 which would prevent vehicle 1070 from proceeding though intersection 602. In this example, the characteristics of the vehicle 1070 received from the perception system 172 may identify the vehicle 1070 as being a vehicle type of object, located relative to vehicle 100 and a stop sign as shown in the example of FIG. 10, stopped, and oriented in a particular direction relative to the vehicle. The perception system 172 may also provide situational information indicating that the area in front of the vehicle 1070 is clear and that there are no other vehicles approaching, passing though, or stopped at the intersection 604 which would prevent vehicle 1070 from proceeding though intersection 602. In this example, the vehicles' computing devices may use the map information which indicates that when approaching a four way stop, the vehicle that reached the intersection first has the right of way to determine that the vehicle 1070 has the right of way, because the vehicle 1070 reached the intersection 604 prior to vehicle 100. However, because vehicle 1070 is stopped and not proceeding through the intersection 604, the vehicle 1070 is preventing the vehicle 100 from continuing along a particular path (depicted by dashed arrow 1080) towards the destination because vehicle 100 cannot legally (because of the rules of the stop signs of the intersection 602) and/or safely pass in front of vehicle 1070 to continue along the particular path.

When the vehicle is determined to be prevented from proceeding, the computing devices 110 may use the characteristics of the object, as well as other objects identified the vehicle's environment to identify a scenario of the predetermined scenarios of data 134. For instance, the characteristics of the object and other situational information received from the perception system 172 may be compared to the requirements of the predetermined scenarios to identify a scenario that most closely matches the received characteristics. As an example, the identified predetermined scenario may include the predetermined scenario having the greatest number of requirements that correspond to or are the same as the received characteristics.

For example, the characteristics of bicyclist 670 and the situational information of example situation of FIG. 6 may most closely correspond to requirements of a first predetermined scenario where a bicyclist is stopped in front of the vehicle 100 in the vehicle's lane where there is no other object in front of the bicyclist. The characteristics of vehicle 770 and the situational information of example situation of FIG. 7 may most closely correspond to requirements of a second predetermined scenario where another vehicle is stopped in front of the vehicle 100 at a stop sign for an intersection, but there is no oncoming or other traffic preventing the another vehicle from proceeding through the intersection. The characteristics of vehicle 870 and the situational information of example situation of FIG. 8 may most closely correspond to requirements of a third predetermined scenario where another vehicle is stopped at yield sign in front of vehicle 100, but there is no other traffic preventing the another vehicle from proceeding through the yield sign. The characteristics of vehicle 970 and the situational information of example situation of FIG. 9 may most closely correspond to requirements of a fourth predetermined scenario where another vehicle is stopped at a particular traffic signal light in front of vehicle 100, but that traffic signal light is green, and thus indicates that the another vehicle currently has the right to proceed. The characteristics of vehicle 1070 and the situational information of example situation of FIG. 10 may most closely correspond to requirements of a fifth predetermined scenario where another vehicle is stopped at an intersection having a multiway stop at which the vehicle 100 is also stopped, but the another object was stopped before vehicle 100, and thus, has the right to proceed through the intersection but is not proceeding.

Once a predetermined scenario is identified, the computing devices 110 may also identify the predetermined period of time and type of audible indication associated with the identified predetermined scenario. For instance, the information may be retrieved from a database or table of data 134 as indicated above. In this regard, each respective predetermined scenarios identified for the example situations of FIGS. 6-10 may be associated with a predetermined period of time and a type of audible indication appropriate for the example situation.

The vehicle's computing devices 110 may then cause the vehicle to begin waiting the predetermined period of time. By waiting, the vehicle's computing device 110 may initiate a count down or begin a timer to determine when the predetermined period of time has passed. For example, in each of the example situations of FIGS. 6-10, the computing devices 110 may wait the predetermined period of time associated with the respective identified scenario.

Once this predetermined period of time has passed, the computing devices 110 may again determine whether the object continues to prevent the vehicle from proceeding along the path. For instance, the computing devices 110 may receive updated characteristics for the object and situational information received from the perception system 172 after the received characteristics. The updated characteristics may be used to determine whether the object is still preventing the vehicle from proceeding along the path, even where the object has moved while the computing devices 110 were waiting the predetermined period of time. In some cases, this may involve determining whether the received updated characteristics still correspond to at least one of the predetermined scenarios (either the identified predetermined scenario or a different one of the predetermined scenarios). In this regard, the computing devices 110 can still confirm that there is no reason that the object should not move or change its trajectory in order to allow the vehicle 100 to proceed along the particular path.

For example, in the example situation of FIG. 6, the computing devices 110 may determine whether bicycle 670 is still preventing vehicle 100 from continuing along the particular path depicted by dashed arrow 680 after the predetermined period of time associated with the first predetermined scenario has passed. Similarly, in the example situation of FIG. 7, the computing devices 110 may determine whether vehicle 770 is still preventing vehicle 100 from continuing along the particular path depicted by dashed arrow 780 after the predetermined period of time associated with the second predetermined scenario has passed. In the example situation of FIG. 8, the computing devices 110 may determine whether vehicle 870 is still preventing vehicle 100 from continuing along the particular path depicted by dashed arrow 880 after the predetermined period of time associated with the third predetermined scenario has passed. In the example situation of FIG. 9, the computing devices 110 may determine whether vehicle 970 is still preventing vehicle 100 from continuing along the particular path depicted by dashed arrow 980 after the predetermined period of time associated with the fourth predetermined scenario has passed. In the example situation of FIG. 10, the computing devices 110 may determine whether vehicle 1070 is still preventing vehicle 100 from continuing along the particular path depicted by dashed arrow 1080 after the predetermined period of time associated with the fifth predetermined scenario has passed.

While the computing devices 110 are waiting, they may continuously receive new information, characteristics and situational information, from the perception system 172. If the received characteristics for the object and the situational information indicate that the object is no longer preventing the vehicle from proceeding along the particular path, then the vehicle can simply continue along the predetermined path.

When the object continues to prevent the vehicle from proceeding along the particular path after the predetermined period has passed, the computing devices 110 may cause the type of audible indication associated with the identified scenario to play through one or more of the speakers 314. For instance, the speakers may play a honking noise according to the pitch, pattern, duration, and volume defined by the type of audible indication associated with the identified scenario. By doing so, the computing devices 110 may attempt to encourage the object to take an action to allow the vehicle to proceed along the particular path.

For instance, assuming in the example situation of FIG. 6 that the bicycle 670 is determined to be still preventing vehicle 100 from continuing along the particular path depicted by dashed arrow 680, the computing device 110 may play an audible indication defined by the type of audible indication associated with the first predetermined scenario. By doing so, the computing devices 110 may encourage the bicycle 670 to continue moving away from intersection 602.

Similarly, assuming in the example situation of FIG. 7 that the vehicle 770 is determined to be still preventing vehicle 100 from continuing along the particular path depicted by dashed arrow 780, the computing device 110 may play an audible indication defined by the type of audible indication associated with the second predetermined scenario. By doing so, the computing devices 110 may encourage the vehicle 770 to move through the intersection 604.

Again, assuming in the example situation of FIG. 8 that the vehicle 870 is determined to be still preventing vehicle 100 from continuing along the particular path depicted by dashed arrow 880, the computing device 110 may play an audible indication defined by the type of audible indication associated with the third predetermined scenario. By doing so, the computing devices 110 may encourage the vehicle 870 to continue passed the yield sign 650.

Assuming in the example situation of FIG. 9 that the vehicle 970 is determined to be still preventing vehicle 100 from continuing along the particular path depicted by dashed arrow 980, the computing device 110 may play an audible indication defined by the type of audible indication associated with the fourth predetermined scenario. By doing so, the computing devices 110 may encourage the vehicle 970 to move through the intersection 602.

Further, assuming in the example situation of FIG. 10 that the vehicle 1070 is determined to be still preventing vehicle 100 from continuing along the particular path depicted by dashed arrow 1080, the computing device 110 may play an audible indication defined by the type of audible indication associated with the fifth predetermined scenario. By doing so, the computing devices 110 may encourage the vehicle 1070 to move through the intersection 604.

The technology is also suitable for various alternatives. As an example, rather than playing the audible indication associated with the identified predetermined scenario, the type of audible indication associated with the different one of the predetermined scenarios may be used to play the honking noise. In this way, where the situation of the object and the vehicle 100 has changed, the audible indication played may be the most relevant for the current situation. In other examples, rather than a honking noise, another noise, such as a whistle or short melody may be played. In addition or alternatively, the noises may be directional. For examples, to signal the location or existence of the vehicle to a particular object, the noise may be played in the direction of that object.

Figure 11:
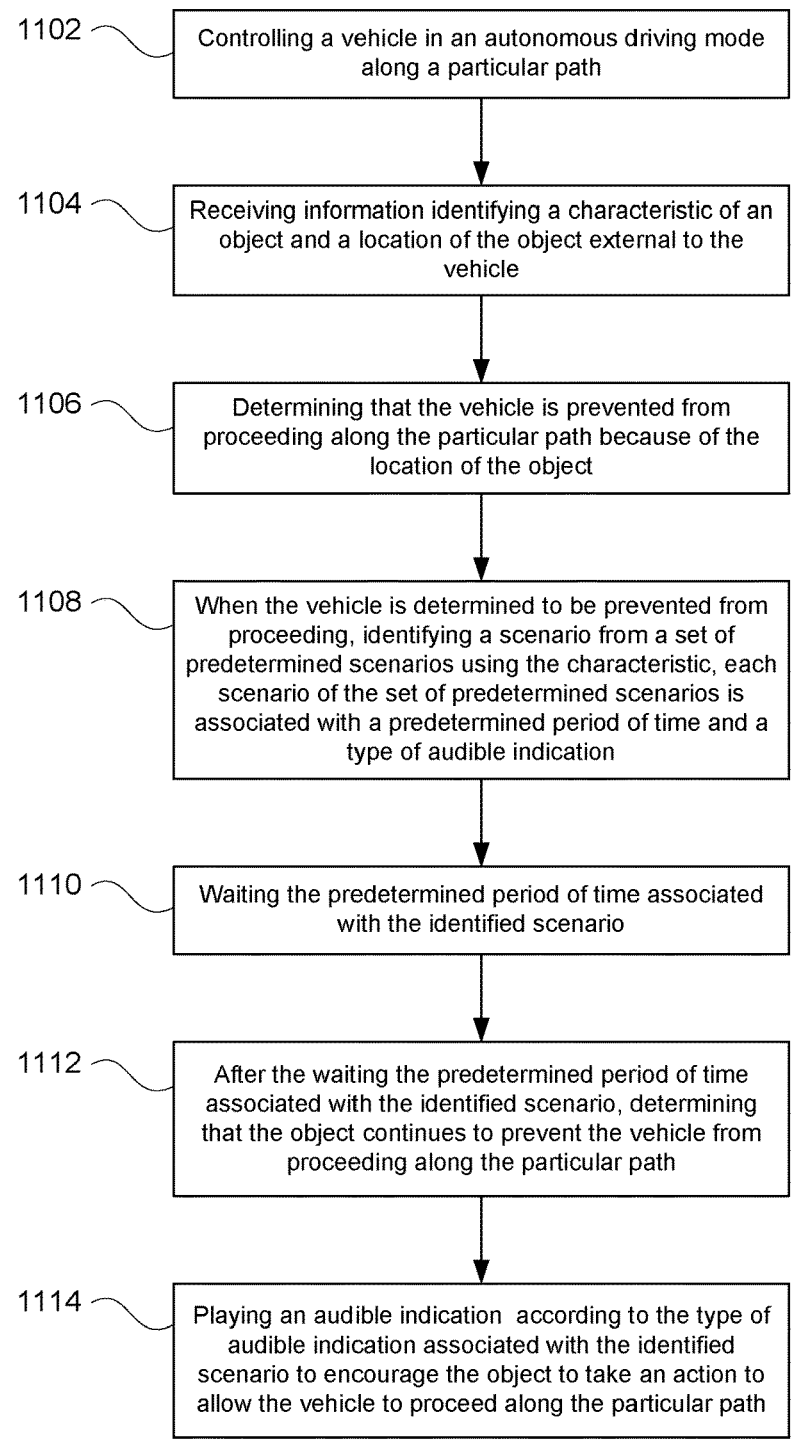
FIG. 11 is a flow diagram in accordance with aspects of the disclosure.

FIG. 11 is an example flow diagram 1100 of providing audible indications to objects located externally to a vehicle, such as vehicle 100, which may be performed by one or more of the computing devices 110. In this example, a vehicle is controlled in an autonomous driving mode along a particular path at block 1102. Information identifying a characteristic of an object and a location of the object external to the vehicle are received at block 1104. The vehicle is determined to be prevented from proceeding along the particular path because of the location of the object at block 1106. When the vehicle is determined to be prevented from proceeding, a scenario is identified from a set of predetermined scenarios using the characteristic at block 1108. Each scenario of the set of predetermined scenarios is associated with a predetermined period of time and a type of audible indication. The predetermined period of time associated with the identified scenario is then waited at block 1110. After the waiting the predetermined period of time associated with the identified scenario, the object is determined to continue to prevent the vehicle from proceeding along the particular path at block 1112. When the object is determined to continue to prevent the vehicle from proceeding along the particular path, the audible indication is played through a speaker of the vehicle according to the type of audible indication associated with the identified scenario to encourage the object to take an action to allow the vehicle to proceed along the particular path at block 1114.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of providing audible indications to objects located externally to a vehicle having an autonomous driving mode, the method comprising:

controlling, by one or more processors, the vehicle in the autonomous driving mode along a particular path;

receiving, by the one or more processors, information identifying a characteristic of an object and a location of the object external to the vehicle;

determining, by the one or more processors, that the vehicle is prevented from proceeding along the particular path because of the location of the object;

identifying a predetermined period of time and an audible indication based on the characteristic of the object;

waiting, by the one or more processors, the identified predetermined period of time;

after waiting the identified predetermined period of time associated, determining, by the one or more processors, that the object continues to prevent the vehicle from proceeding along the particular path; and when the object is determined to continue to prevent the vehicle from proceeding along the particular path, playing, by the one or more processors, the audible indication through a speaker of the vehicle to encourage the object to take an action to allow the vehicle to proceed along the particular path.

2. The method of claim 1, wherein the characteristic includes that the object is currently stationary.

3. The method of claim 2, wherein the characteristic includes that the object is another vehicle.

4. The method of claim 2, wherein the characteristic includes that the object is a pedestrian.

5. The method of claim 2, wherein the characteristic includes that the object is a bicyclist.

6. The method of claim 1, further comprising determining that the object is currently not being blocked by another object that would prevent the object from proceeding, and wherein identifying the predetermined period of time is further based on the determination that the object is currently not being blocked by another object.

7. The method of claim 1, wherein the characteristic includes that the location of the object corresponds to a same lane as the vehicle and within the particular path.

8. The method of claim 1, wherein the characteristic includes a status of a turn signal of the object.

9. The method of claim 1, wherein the characteristic includes a location of the object relative to a particular traffic signal light, and the method further comprises:
 determining that a status of the particular traffic signal indicates that the object currently has a right of way, and
 wherein the predetermined period of time is identified further based on the status of the particular traffic signal.

10. The method of claim 1, wherein the characteristic includes a location of the object relative to a particular stop sign, and the method further comprises:
 determining that the object currently has a right to proceed despite the presence of the stop sign, and
 wherein the predetermined period of time is identified further based on the stop sign.

11. The method of claim 1, wherein the characteristic includes a location of the object relative to a particular yield sign, and the method further comprises:
 determining that the object currently has a right to proceed despite the presence of the yield sign, and
 wherein the predetermined period of time is identified further based on the yield sign.

12. A system for providing audible indications to objects located externally to a vehicle having an autonomous driving mode, the system comprising:
 one or more processors configured to:
  control the vehicle in the autonomous driving mode along a particular path;
  receive information identifying a characteristic of an object and a location of the object external to the vehicle;
  determine that the vehicle is prevented from proceeding along the particular path because of the location of the object;
  identify a predetermined period of time and an audible indication based on the characteristic;
  wait the identified predetermined period of time;

after waiting the identified predetermined period of time, determine that the object continues to prevent the vehicle from proceeding along the particular path; and when the object is determined to continue to prevent the vehicle from proceeding along the particular path, play the audible indication through a speaker of the vehicle to encourage the object to take an action to allow the vehicle to proceed along the particular path.

13. The system of claim 12, wherein the one or more processors are further configured to determine that the object is currently not being blocked by another object that would prevent the object from proceeding.

14. The system of claim 12, wherein the characteristic includes that the location of the object corresponds to a same lane as the vehicle and within the particular path.

15. The system of claim 12, wherein the characteristic of the object includes a status of a turn signal of the object.

16. The system of claim 12, wherein the characteristic includes a location of the object relative to a particular traffic signal light, and the one or more processors are further configured to:
 determine that a status of the particular traffic signal indicates that the object currently has a right of way, and
 identify the predetermined period of time further based on the status of the particular traffic signal.

17. The system of claim 12, wherein the characteristic includes a location of the object relative to a particular stop sign, and the one or more processors are further configured to:
 determine that the object currently has a right to proceed despite the presence of the stop sign, and
 identify the predetermined period of time further based on the stop sign.

18. The system of claim 12, wherein the characteristic includes a location of the object relative to a particular yield sign, and the one or more processors are further configured to:
 determine that the object currently has a right to proceed despite the presence of the yield sign, and
 identify the predetermined period of time further based on the yield sign.

19. The system of claim 12, further comprising the vehicle and the speaker.

20. A non-transitory computer readable storage medium on which instructions are stored, the instructions, when executed by one or more processors cause the one or more processors to perform a method of providing audible indications to objects located externally to a vehicle having an autonomous driving mode, the method comprising:
 controlling the vehicle in the autonomous driving mode along a particular path;
 receiving information identifying a characteristic of an object and a location of the object external to the vehicle;
 determining that the vehicle is prevented from proceeding along the particular path because of the location of the object;
 when the vehicle is determined to be prevented from proceeding, identifying a predetermined period of time and a audible indication based on the characteristic;
 waiting the identified predetermined period of time associated=;

after waiting the identified predetermined period of time, determining that the object continues to prevent the vehicle from proceeding along the particular path; and when the object is determined to continue to prevent the vehicle from proceeding along the particular path, playing the audible indication through a speaker of the vehicle to encourage the object to take an action to allow the vehicle to proceed along the particular path.

* * * * *